United States Patent [19]

Corley

[11] Patent Number: 5,346,769
[45] Date of Patent: Sep. 13, 1994

[54] PROCESS FOR PREPARING A PREPEG COMPRISING A RESIN DERIVED FROM DIALKENYLBENZENE AND POLYARYLAMINE REACTANTS

[75] Inventor: Larry S. Corley, Houston, Tex.

[73] Assignee: Shell Oil Company, Houston, Tex.

[21] Appl. No.: 71,426

[22] Filed: Jun. 2, 1993

Related U.S. Application Data

[62] Division of Ser. No. 813,617, Dec. 26, 1991, abandoned.

[51] Int. Cl.$^5$ .............. B32B 17/06; B32B 9/04; C08G 67/02
[52] U.S. Cl. .................. 428/426; 428/411.1; 428/441; 526/217; 526/336; 528/392
[58] Field of Search .............. 428/426, 441, 411.1; 528/392; 526/217, 336

[56] References Cited

U.S. PATENT DOCUMENTS

| | | | |
|---|---|---|---|
| 4,205,160 | 5/1980 | Gloth et al. | 528/425 |
| 4,414,348 | 11/1983 | Gloth et al. | 524/255 |
| 4,417,017 | 11/1983 | Gloth et al. | 524/255 |
| 4,463,170 | 7/1984 | Gloth et al. | 528/422 |
| 4,537,952 | 8/1985 | Gloth et al. | 528/392 |
| 4,668,758 | 5/1981 | Corley | 528/91 |

FOREIGN PATENT DOCUMENTS

| | | |
|---|---|---|
| 59-144721 | 8/1984 | Japan . |
| 59-145207 | 8/1984 | Japan . |

OTHER PUBLICATIONS

Smith et al., "Synthesis of Copolymers of m–Diisopropenylbenzene", *New Monomers and Polymers*, pp. 415–429 (1984).

D'Onofrio, "New Catalysts for Polymerization of Diisopropenylbenzenes," *J. App. Polymer Sci.*, 8, pp. 521–526 (1964).

*Primary Examiner*—Morton Foelak
*Assistant Examiner*—Terressa M. Mosley

[57] ABSTRACT

A solventless thermosettable composition comprising a dialkenylbenzene and an effective amount of an alkylbenzenesulfonic acid curing agent exhibits reduced tendency to gel during cure with the addition of a polyarylamine. The cured material, which is particularly useful in electrical/electronic applications, exhibits low dielectric constant and good fracture toughness.

11 Claims, No Drawings

PROCESS FOR PREPARING A PREPEG COMPRISING A RESIN DERIVED FROM DIALKENYLBENZENE AND POLYARYLAMINE REACTANTS

This is a division of application Ser. No. 813,617, filed Dec. 26, 1991, now abandoned.

BACKGROUND OF THE INVENTION

This invention relates to the catalytic cure of dialkenylbenzene monomers. In a specific aspect, the invention relates to the preparation of low dielectric constant thermosets for electrical laminating applications.

For electrical lamination, in which a glass substrate is impregnated with a thermosettable resin for ultimate use as a printed circuit board, low dielectric constant thermoset materials are desirable. Pure hydrocarbon materials give promise for achieving the desired low dielectric constant, since polar groups tend to raise the dielectric constant of the polymer. Liquid butadiene oligomers cured with peroxides have been used as an all-hydrocarbon laminating material, but cure is slow and large quantities of peroxides are required. Divinylbenzene and divinylbenzene/styrene mixtures cured with free radical initiators provide another all-hydrocarbon system, but these monomers are undesirably volatile and tend to gel at a low conversion level, leading to shrinkage and cracking in the cured material.

It is therefore an object of the invention to provide a curable composition which cures to a low dielectric constant thermoset material. In one embodiment, it is an object of the invention to provide a process for preparing a low dielectric constant thermoset material which addresses the problem of premature gelation of the uncured system.

SUMMARY OF THE INVENTION

According to the invention, a curable composition comprising a dialkenylbenzene and an effective amount of a cationic curing agent exhibits a reduced tendency to gel during cure with the addition of a polyarylamine to the composition. In one embodiment of the invention, a prepreg is prepared by impregnating an adsorbent substrate such as glass fibers with a solventless composition comprising (a) a dialkenylbenzene, (b) a cationic curing agent and (c) a polyarylamine, and then heating the impregnated substrate to effect partial cure of the composition. The cured dialkenylbenzene exhibits a low dielectric constant and good toughness.

DETAILED DESCRIPTION OF THE INVENTION

The invention composition includes a dialkenylbenzene of the structural formula

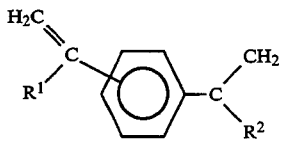

in which $R^1$ and $R^2$ are each independently selected from $C_{1-6}$ alkyl, $C_{1-6}$ alkoxy and halogen, preferably $C_{1-3}$ alkyl. In a preferred embodiment, each of $R^1$ and $R^2$ is methyl and the monomer is 1,3- or 1,4-diisopropenylbenzene.

The invention composition includes a polyarylamine, including without limitation diarylamines and triarylamines. Preferred polyarylamines are substituted or unsubstituted di- or triphenylamines such as those represented by the following structural formulas:

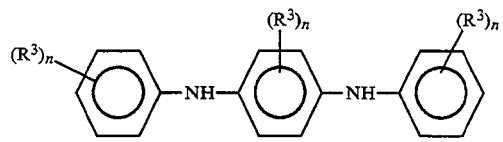

and

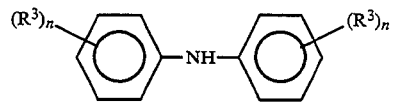

in which each $R^3$ is independently selected from non-interfering substituents such as $C_{1-20}$ alkyl, $C_{1-20}$ alkoxy and halide, and n is an integer from 0 to 5. Polyarylamines include, for example, diphenylamine, 4,4'-diethoxydiphenylamine, 3,3',5,5'-tetramethyldiphenylamine, 1,4-bis(phenylamino)benzene and 1,4-bis(2-naphthylamino)benzene. The polyarylamine is present in the composition in an amount effective to inhibit premature gelation of the catalyzed dialkenylbenzene. Generally, the polyarylamine will be present in an amount within the range of about 0.01 to about 100, preferably about 0.05 to about 20, moles per mole of the cationic curing agent.

The invention composition includes a cationic curing agent for the dialkenylbenzene monomer. Included within the class of cationic curing agents are Lewis acids and their complexes, protonic acids containing anions of low nucleophilicity and salts of such protonic acids. Examples of cationic curing agents include sulfuric acid; organic sulfonic acids such as alkylbenzenesulfonic acids, alkanesulfonic acids, hydroxyalkanesulfonic acids and trifluoromethanesulfonic acid; tetrafluoroboric acid; boron trifluoride complexes such as boron trifluoride etherate; hexafluorophosphoric acid; hexafluoroantimonic acid; boron trifluoride; boron trichloride; tin tetrachloride; tin tetrafluoroborate: and aluminum tetrafluoroborate. The currently-preferred acid is a detergent-range ($C_{10-20}$) alkylbenzenesulfonic acid such as that available as LAS acid from Vista Chemical Corporation. The curing agent is present in the composition in an amount effective to initiate cure of the dialkenylbenzene. Generally, the curing agent is present in an amount within the range of about 0.01 to about 10, preferably about 0.05 to about 5, weight percent, based on the weight of the dialkenylbenzene.

The quantity of the polyarylamine/acid mixture present in the composition (as well as the polyarylamine:acid ratio) depends to some extent on the properties desired in the cured material. It has been found that, at lower levels of the mixture relative to the monomer and higher polyarylamine:acid ratios, the cured material will tend to exhibit lower Tg and higher toughness, while higher levels of the mixture and lower polyarylamine: acid ratios tend to produce a cured material having relatively high Tg and lower toughness.

The cure process involves exposing the dialkenylbenzene monomer to an elevated temperature in the presence of the cationic curing agent and the polyarylamine.

In the preferred process, the curing agent and the polyarylamine are premixed just prior to being added, with stirring, to the monomer. Cure temperatures are generally within the range of about 125 to about 250° C. Preferably, cure will be carried out in stages of increasing temperature. Cure will generally be complete within about 1 to about 10 hours. In general, higher cure temperatures and/or longer cure times tend to decrease the toughness of the cured material and to increase its Tg. The curing reaction is carried out in the absence of a solvent for the dialkenylbenzene, as polymerization in a solvent will tend to yield thermoplastic materials rather than the desired thermoset materials.

The invention compositions are useful as the matrix resin of a composite for electrical/electronics, aerospace and automotive applications. The low dielectric constant (less than about 3.0) of the cured material makes the compositions particularly desirable for glass fiber-reinforced electrical laminating uses. The compositions can be fabricated into composites with reinforcing fibers by techniques such as prepreg layup, wet or dry filament winding, pultrusion, reaction injection molding and resin transfer molding. The low viscosity of the uncured compositions offers the advantage of usefulness in liquid fabrication techniques without the necessity of recovery or disposal of a solvent. The compositions can also be used in adhesives or coatings, or for encapsulation of electronic devices.

For preparation of reinforced laminates from the curable composition, a fibrous substrate of glass, carbon, quartz, polyester, polytetraflouroethylene, polybenzothiazole, boron, paper or like material, in chopped, mat or woven form, is first impregnated with the composition. A prepreg is formed by heating the impregnated substrate in an oven at a temperature sufficient to partially cure without gelation, or "B-stage," the blended resin system, generally about 40 to about 200° C., preferably about 70 to about 190° C., for a time of up to about 10 minutes, preferably about 30 seconds to about 2 minutes. The composition is optionally upstaged before substrate impregnation by heating at a relatively mild temperature of about 50 to 100° C. to provide optimum viscosity for the processing methods and conditions. A laminate is fabricated by subjecting a set of layered prepregs to conditions effective to cure the resin and to integrate the prepregs into a laminated structure. The laminate can optionally include one or more layers of a conductive material such as copper. Laminatinq conditions generally include a time of about 30 minutes to about 4 hours, preferably about 1 to about 2 hours, a temperature of about 160 to about 300° C., preferably about 170 to 200° C., and a pressure of about 50 to about 500 psi. The laminates can be optionally "post-cured" by heating at a temperature of about 200 to about 230° C. at ambient pressure for about 1 to 6 hours to improve thermal properties.

EXAMPLE 1

This comparison experiment was performed to polymerize a dialkenyllbenzene monomer using an unmodified cationic curing agent. Ten grams of 1,3-diisopropenylbenzene (DIPB; Aldrich, 97%) and 0.0534, 0.0240 and 0.0C90 grams, respectively, of an alkylbenzenesulfonic acid (LAS acid from Vista Chemical Company) were added to three vials and the vials were shaken. The via).s contained small globules of darkened material (which were considered to be acid droplets encapsulated by DIPB polymer) in a relatively soft, slightly gelled mass. Upon addition of the acid to the DIPB, mixing could not be carried out fast enough to dissolve the acid before the acid droplets became encapsulated with polymer.

EXAMPLE 2

This experiment was performed to show the effect of adding a diphenylamine to the cationic curing agent. The same alkylbenzenesulfonic acid used in Example 1 was mixed with an equal weight of a liquid alkylated diphenylamine (Naugalube ® 438L). Aliquots of 0.1039 g and 0.0347 g were added to vials containing log of diisopropenylbenzene monomer. The components mixed easily at room temperature. The mixtures were poured into test tubes and the test tubes were placed in a 150° C. oil bath. Gelation was observed in one mixture after 45 minutes and a marked increase in viscosity was seen in the other after seven hours.

EXAMPLE 3

The acid used in Example 1 was mixed with Naugalube ® 438L or diphenylamine in the proportions shown in Table 1, and the acid/amine mixture was then mixed into 50 g of DIPB in a flask. The mixtures were stirred at room temperature until homogeneous. The mixtures were then poured into a rectangular stainless steel mold with a 3.2 mm thick cavity, with the mold parts separated by an airtight rubber gasket to permit mold pressurization during cure. The mold was placed into an oven under about 790 kPa nitrogen pressure, and the systems were cured as shown in Table 1. Test specimens were machined from the castings and mechanical and electrical properties of the specimens were determined.

As can be seen from Table 1, all of the castings had low values of dielectric constant (2.3 to 2.6) and several were also high in fracture toughness (greater than 1 MPa-m$^{\frac{1}{2}}$). Some castings combined high fracture toughness with high flexural modulus (4 GPa or higher), a property combination unusual in thermosetting polymers. As shown by castings 7 and 8, the system can be tolerant of large ratios of diphenylamine to DIPB and large ratios of diphenylamine to sulfonic acid.

TABLE 1

Properties of Cationically-Cured 1,3-Diisopropenylbenzene (DIPB) Castings

| | LAS acid,[a] phr | Amine modifier[b] (phr) | Cure cycle[c] | Dynamic mechanical Tg, °C. | R.T. dry Flexural (ASTM D-790) | | | Compact tension fracture toughness, Kq, MPa-m$^2$ (ASTM E 399-83) | Dielectric constant (dissipation factor), 1 MHz (ASTM D229/15) | R.T. MEK pickup, 1 day %[d] | Gel content, %[e] |
|---|---|---|---|---|---|---|---|---|---|---|---|
| | | | | | Break strength, MPa | Tangent modulus, GPa | Elong. at break, % | | | | |
| 1 | 0.50 | N438L (0.50) | A | | 87 ± 11 | 4.10 ± 0.50 | 2.3 ± 0.3 | 2.15 ± 0.30 | 2.50 (.000306) | 75.2 | 87 |
| 2 | 0.52 | N438L (0.50) | A | 110 | 75 ± 4 | 4.04 ± 0.22 | 1.9 ± 0.1 | 2.10 ± 0.06 | 2.49 (.00063) | 77.2 | 87 |

TABLE 1-continued

Properties of Cationically-Cured 1,3-Diisopropenylbenzene (DIPB) Castings

| | LAS acid,[a] phr | Amine modifier[b] (phr) | Cure cycle[c] | Dynamic mechanical Tg, °C. | R.T. dry Flexural (ASTM D-790) | | | Compact tension fracture toughness, Kq, MPa-m² (ASTM E 399-83) | Dielectric constant (dissipation factor), 1 MHz (ASTM D229/15) | R.T. MEK pickup, 1 day %[d] | Gel content, %[e] |
|---|---|---|---|---|---|---|---|---|---|---|---|
| | | | | | Break strength, MPa | Tangent modulus, GPa | Elong. at break, % | | | | |
| 3 | 0.26 | DPA (0.042) | A | 70 | | | | 1.07 ± 0.10 | | | |
| 4 | 0.78 | DPA (0.13) | B | 100 | 98 ± 5 | 3.61 ± 0.05 | 2.9 ± 0.2 | 1.64 ± 0.11 | 2.41 (.000206) | g | |
| 5 | 0.78 | DPA (0.13) | A | 161 | 13 ± 2 | 3.08 ± 0.14 | 0.4 ± 0.1 | f | | 99.3 | 85 |
| 6[h] | 1.54 | DPA (0.26) | C | 202 | 14 ± 2 | 3.14 ± 0.27 | 0.5 ± 0.1 | f | 2.38 (.001008) | 144 | 73 |
| 7 | 1.70 | DPA (10.3) | A | 101 | 73 ± 6 | 3.61 ± 0.08 | 2.1 ± 0.2 | 1.54 ± 0.11 | 2.30 (.00042) | disint. | 93 |
| 8 | 2.56 | DPA (30.4) | A | 111 | 96 ± 8 | 3.68 ± 0.05 | 2.8 ± 0.3 | 1.48 ± 0.64 | 2.55 (.00203) | 77.3 | 99 |

[a]A detergent-range linear alkylbenzenesulfonic acid produced by Vista Chemical Corporation. Phr is by weight, basis 100 parts DIPB.
[b]DPA = diphenylamine; N438L = Naugalube 438L, an alkylated diphenylamine produced by Uniroyal. Phr is by weight, basis 100 parts DIPB.
[c]Cure cycles:
A = 1 hr. at 150° C., 1 hr at 180° C., 1 hr. at 210° C., 30 min. at 230° C., and 1 hr. at 250° C.
B = 1 hr. at 150° C. and 1 hr. at 180° C.
C = 15 min. at 150° C., 1 hr. at 180° C., 1 hr. at 210° C., 30 min. at 230° C., and 1 hr. at 250° C.
[d]Samples of castings 1, 5 and 2 disintegrated after 1 day in CH$_2$Cl$_2$ and after 2 weeks in MEK at room temperature.
[e]Residual mass after two 3-day extractions with CH$_2$Cl$_2$ followed by oven drying overnight at 120° C. under vacuum.
[f]Material was so brittle that specimens broke during attempted precracking.
[g]A specimen increased in weight by 0.45% after 1 day and 0.89% after 2 weeks in 93° C. water.
[h]Ability to mix this composition at room temperature, and pour it into the mold, before gelatin was borderline. A similar system gelled before it could be poured into the mold.

I claim:

1. A process for preparing a prepreg comprising: impregnating a fibrous glass substitute with a solventless thermosettable composition comprising:
   (a) a dialkenylbenzene represented by the structural formula

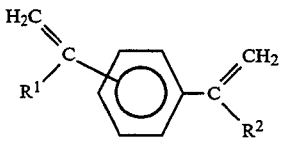

in which R$^1$ and R$^2$ are each independently selected from the group consisting of C$_{1-6}$ alkyl, C$_{1-6}$ alkoxy and halogen;
   (b) from about 0.05 to about 5 weight percent, based on the weight of the dialkenylbenzene, of a cationic curing agent for the dialkenylbenzene; and
   (c) a polyarylamine present in an amount effective to inhibit gelation of the dialkenylbenzene and within the range of about 0.05 and 20 moles per mole of the curing agent; and subjecting said impregnated substrate to an elevated temperature effective to partially cure the thermosettable composition.

2. The process of claim 1 in which the dialkenylbenzene comprises diisopropenyl benzene.

3. The process of claim 1 in which the cationic curing agent is selected from the group consisting of Lewis acids, complexes of Lewis acids, protonic acids having anions of low nucleophilicity, and metal salts of such protonic acids.

4. The process of claim 1 in which the polyarylamine comprises at least one of the group consisting of diphenylamine 4,4'-diethoxydiphenylamine 3,3', 5,5'-tetramethyldiphenylamine, 1,4-bis(phenylamino)benzene and 1,4-bis(2-naphthylamino)benzene.

5. The process of claim 2 in which the polyarylamine is diphenylamine.

6. The process of claim 2 in which the cationic curing agent is an alkyibenzenesulfonic acid.

7. The process of claim 3 in which the cationic curing agent is selected from the group consisting of sulfuric acid, organic sulfonic acids, tetrafluoroboric acid, tetrafluoroboric acid, boron trifluoride etherate, hexafluorophosphoric acid, hexafluoroantimonic acid, boron trifluoride, boron trichloride, tin tetrafluoroborate and aluminum tetrafluoroborate.

8. The process of claim 7 in which the cationic curing agent is an aklylbenzenesulfonic acid.

9. The process of claim 9 in which the polyarylamine is present in the composition in an amount within the range of about 0.05 to about 20 moles per mole of the cationic curing agent.

10. The process of claim 1 in which the cationic curing agent is present in the composition in an amount within the range of about 0.01 to about 10 weight percent, based on the weight of the dialkenylbenzene.

11. The process of claim 1 in which the adsorbent substrate is glass fiber.

* * * * *